United States Patent [19]

Schmidt, deceased

[11] 4,131,390
[45] Dec. 26, 1978

[54] CIRCULATION CONTROLLED ROTOR BLADE

[75] Inventor: Jacob Schmidt, deceased, late of Van Nuys, Calif., by Mia H. Schmidt, administratrix

[73] Assignee: The United States of America as represented by the Secretary of the Navy, Washington, D.C.

[21] Appl. No.: 810,539

[22] Filed: Jun. 27, 1977

[51] Int. Cl.² .................................... B64C 27/18
[52] U.S. Cl. .......................... 416/20 R; 416/90 A
[58] Field of Search ..................... 416/20 R, 90 A

[56] References Cited

U.S. PATENT DOCUMENTS

| 3,172,620 | 3/1965 | Darby | 416/20 X |
| 3,554,664 | 1/1971 | Cheeseman et al. | 416/20 X |
| 3,873,233 | 3/1975 | Linck | 416/20 X |
| 3,889,903 | 6/1975 | Hilby | 416/90 A X |
| 3,964,838 | 6/1976 | Spargo | 416/20 R |

FOREIGN PATENT DOCUMENTS

| 2256124 | 5/1974 | Fed. Rep. of Germany | 416/20 |
| 2258306 | 8/1975 | France | 416/20 |

Primary Examiner—Everette A. Powell, Jr.
Attorney, Agent, or Firm—R. S. Sciascia; Charles D. B. Curry; Francis I. Gray

[57] ABSTRACT

A circulation controlled rotor blade which reduces rotor flutter by introducing a laminar flow over the trailing edge. A trailing edge structure has a deformable tube to control a spanwise slot formed by the juxtaposition of an upper trailing edge lip over the deformable tube. The laminar flow is created by compressed fluid directed through the rotor blade and through the slot.

13 Claims, 9 Drawing Figures

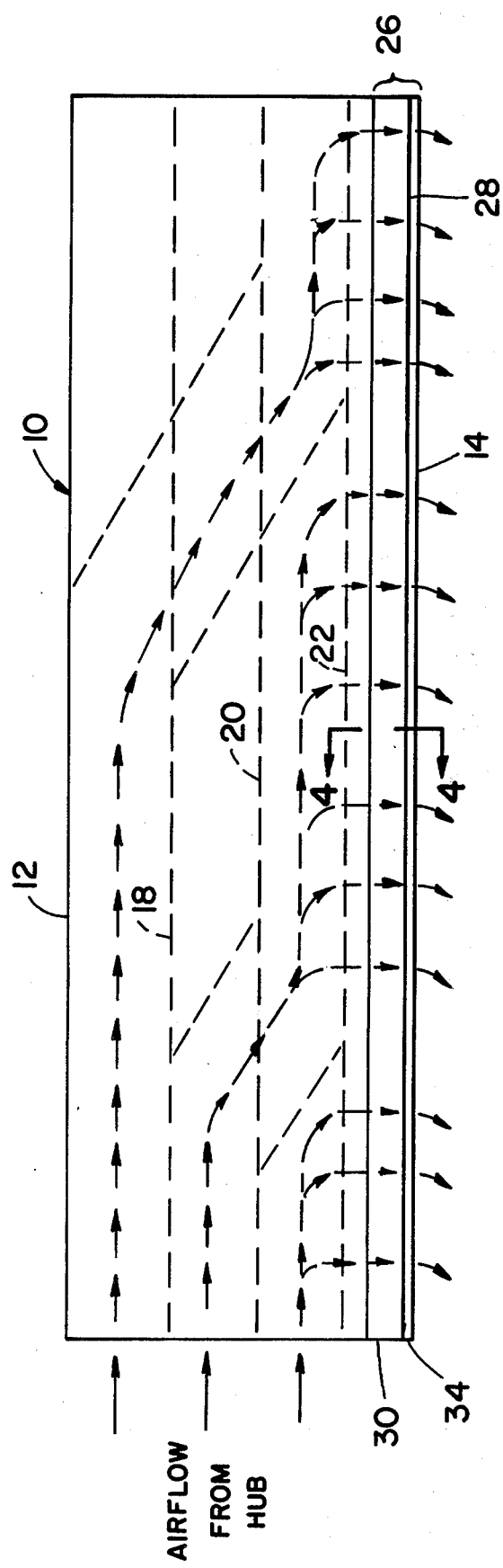
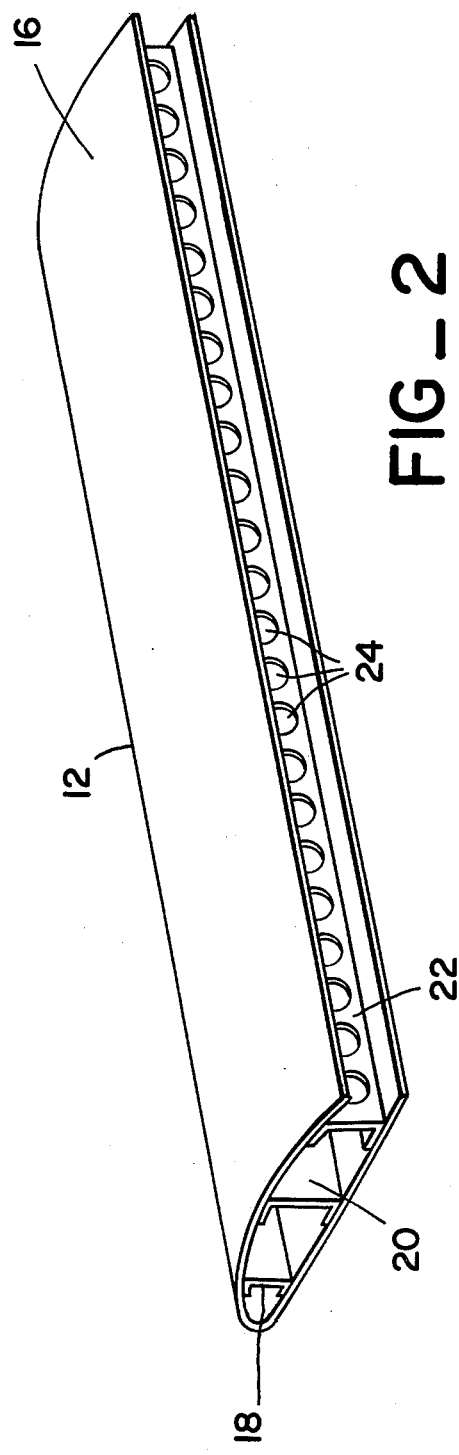
FIG_1
FIG_2

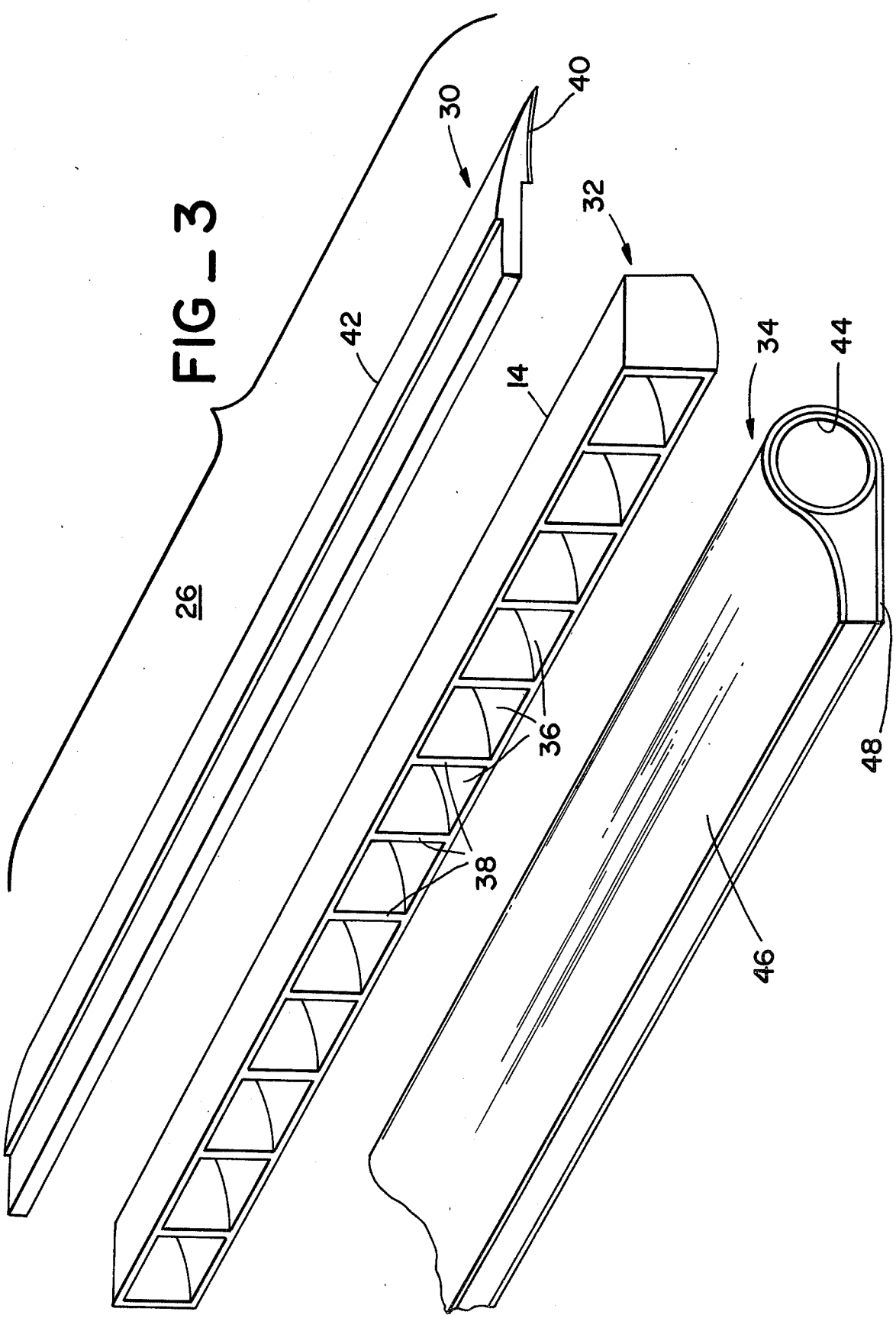

FIG_4
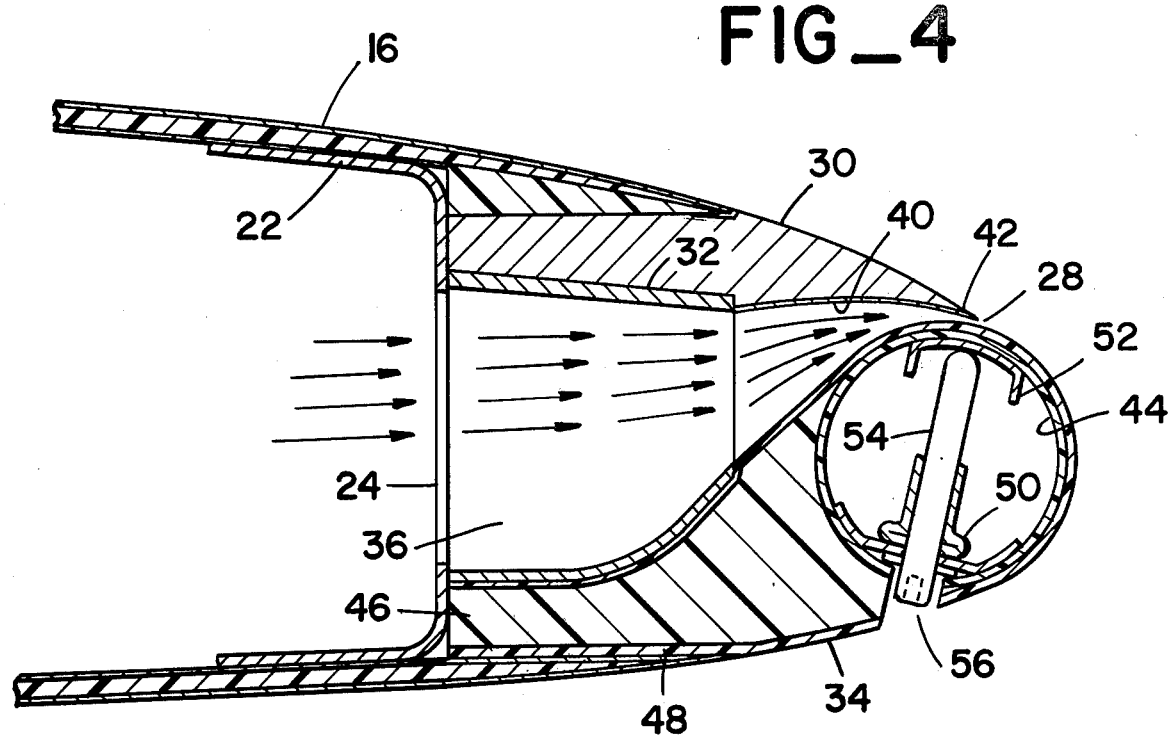
FIG_5
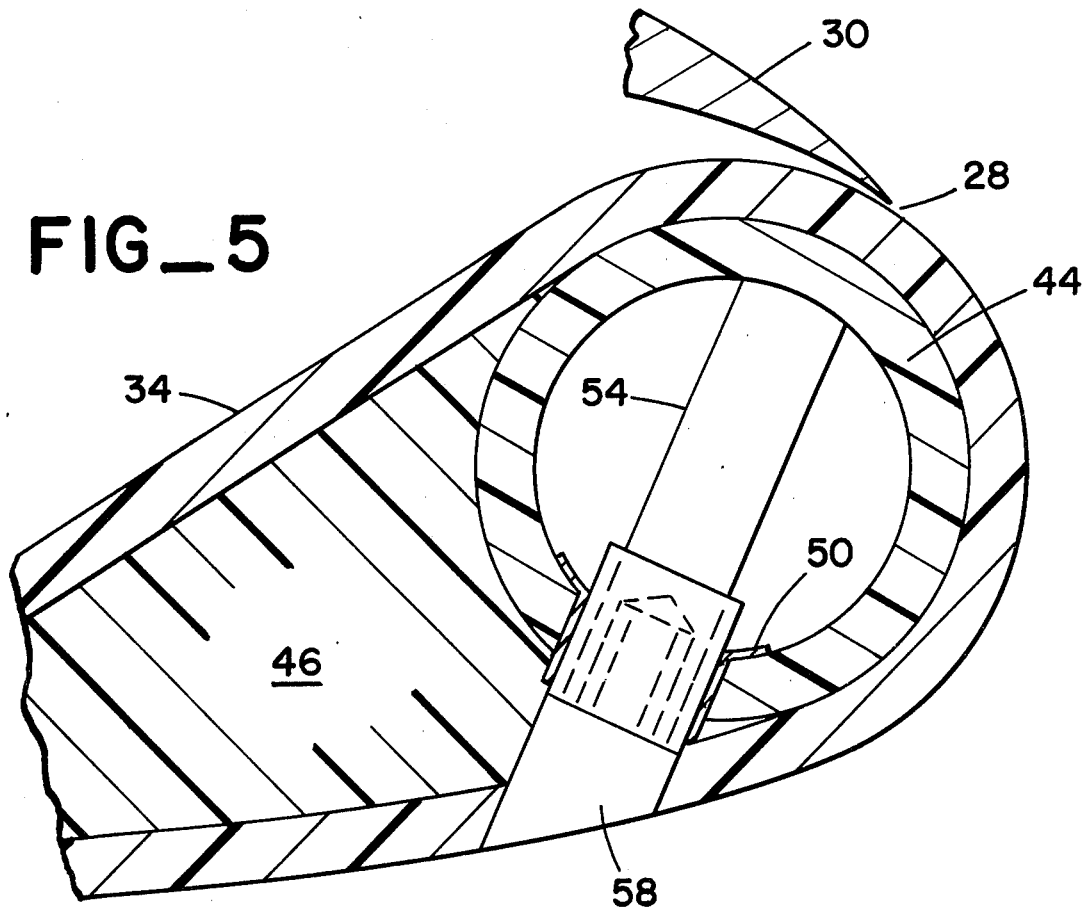

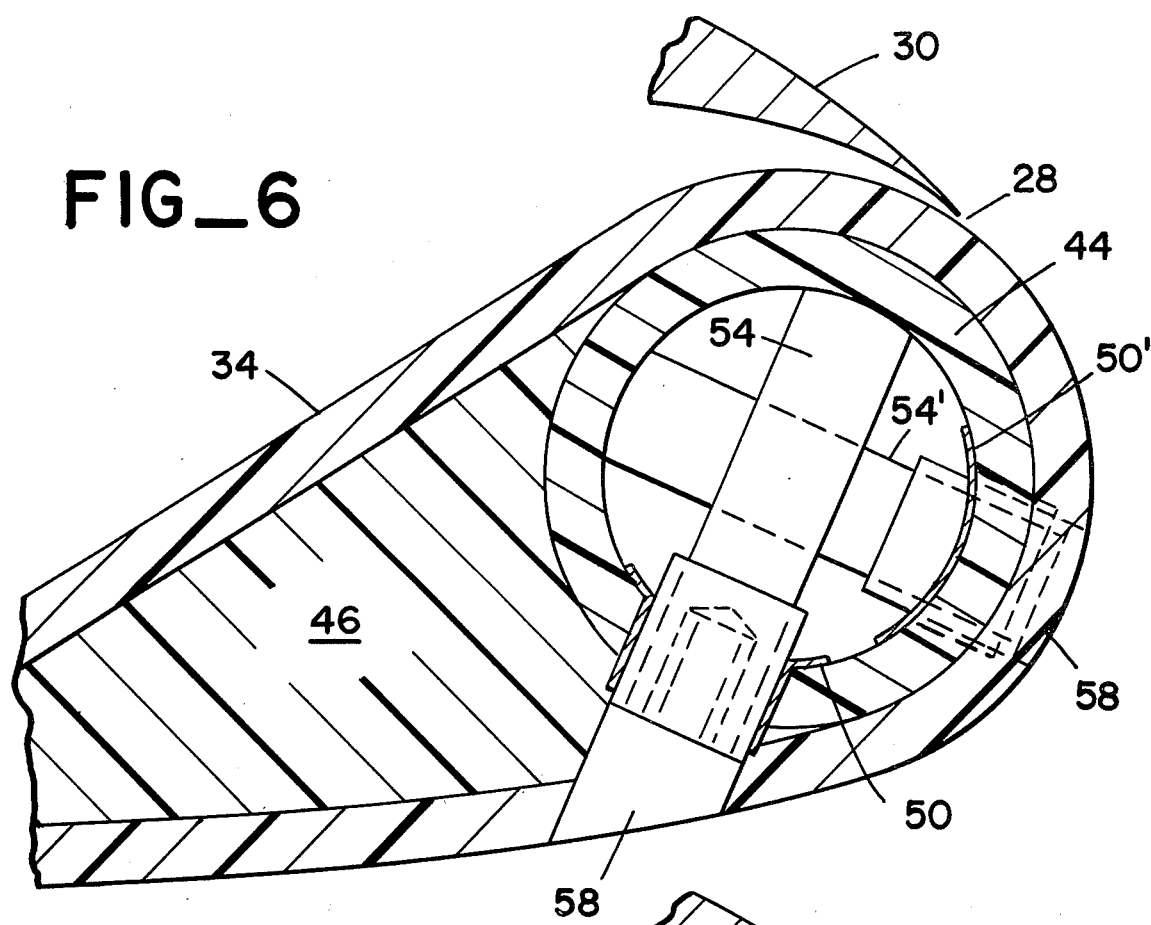
FIG_6
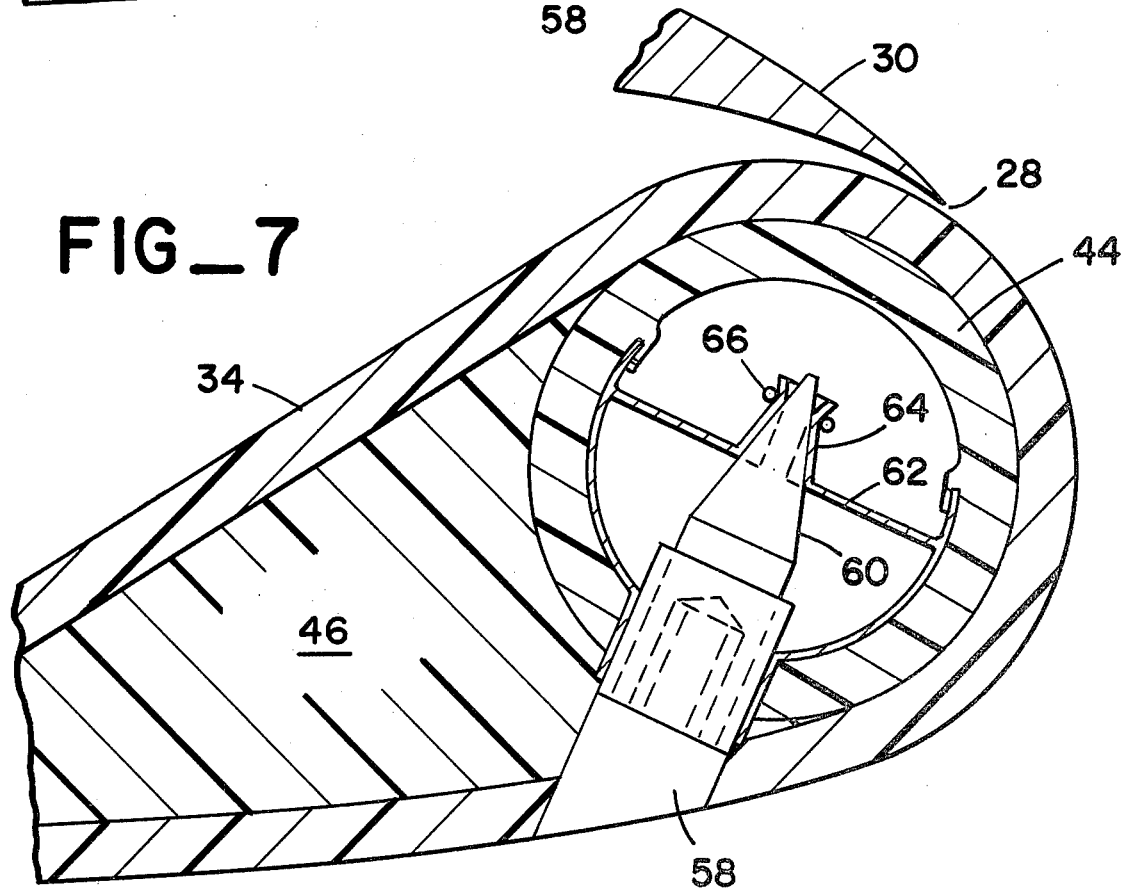
FIG_7

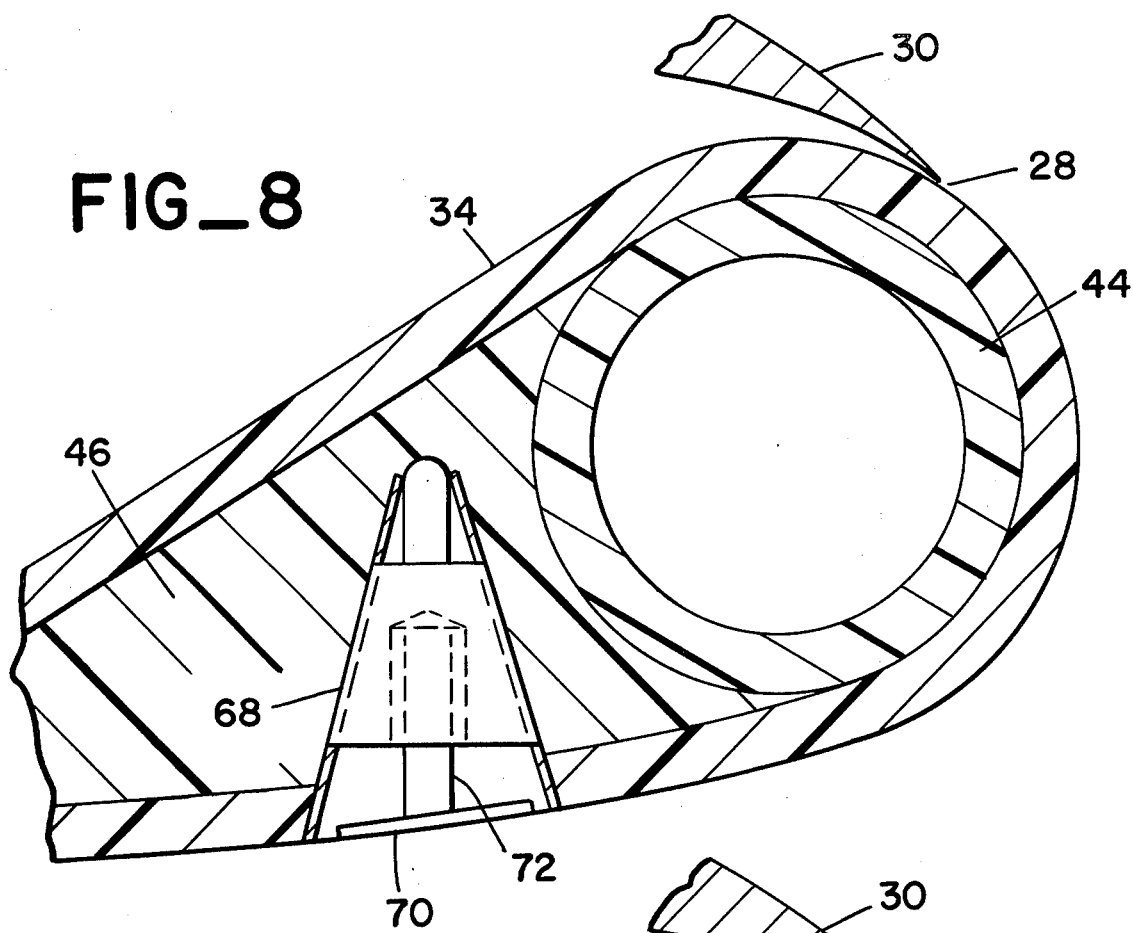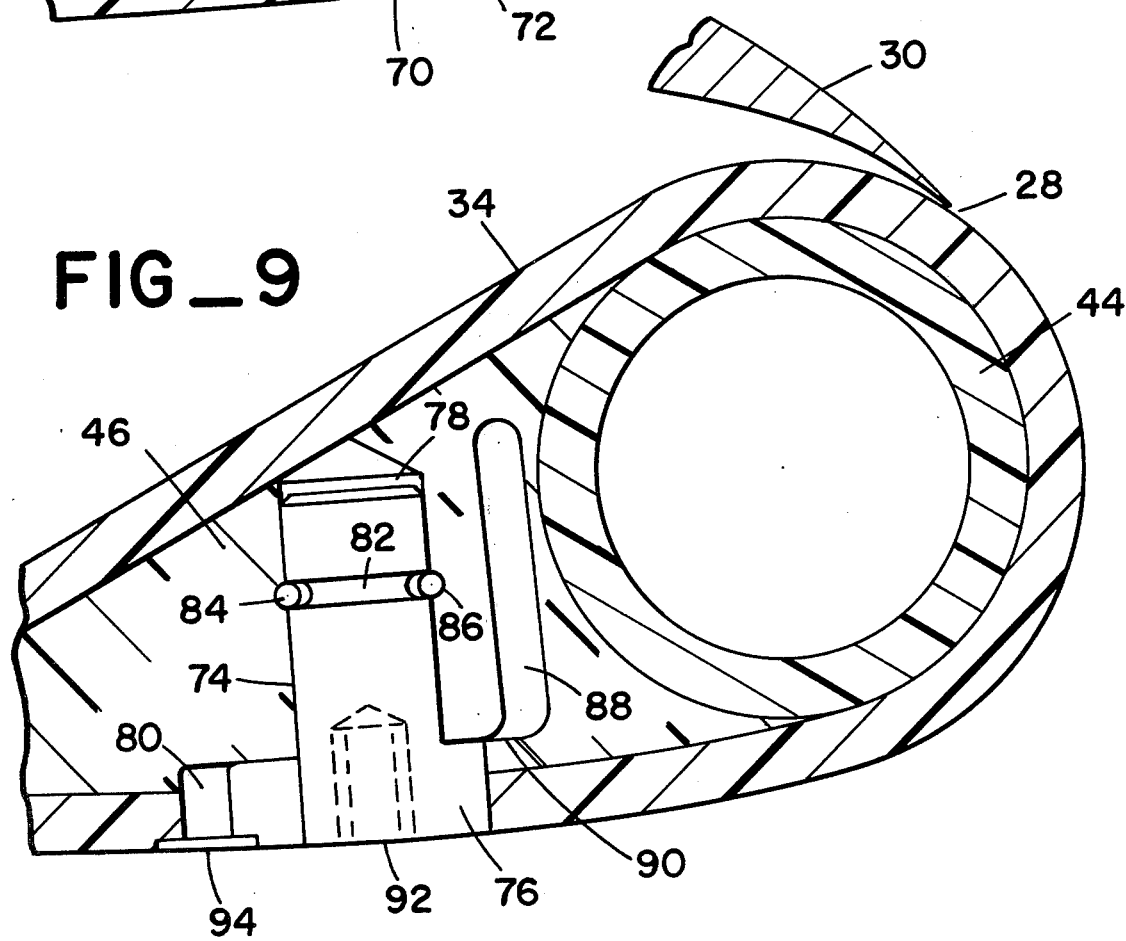

CIRCULATION CONTROLLED ROTOR BLADE

BACKGROUND OF THE INVENTION

1. Field of the Invention

The present invention relates to helicopter rotor blades, and more particularly to circulation controlled rotor blades having an adjustable spanwise slot.

2. Description of the Prior Art

Lift of a helicopter rotor blade is normally varied by mechanically varying the angle of attack of the rotor blade. To feather such a rotor blade requires varying the lift every revolution. To accomplish this by mechanical manipulation of the rotor blade requires complex mechanical linkages and the expenditure of considerable power.

Another persevering problem with existing helicopter blade design has been adverse aerodynamics resulting from the trailing edge facing into the airstream when the blade is in the reverse mode.

SUMMARY OF THE INVENTION

Accordingly, the present invention provides a circulation controlled rotor blade having an adjustable trailing edge spanwise slot. Nonturbulent compressed fluid is directed through the slot, and the gap at the slot is controlled by deforming a tube structure which is one component of a trailing edge assembly. A fluted core supports an upper trailing edge lip with relation to the tube structure to form the slot, and also serves to reduce turbulence in the stream of compressed fluid.

Therefore, it is an object of the present invention to provide for the adjustment of a helicopter rotor blade slot without disturbing the lift of the blade or creating turbulence.

Other objects and advantages of the present invention will be appreciated by reference to the following detailed description when considered in connection with the accompanying drawing.

BRIEF DESCRIPTION OF THE DRAWING

FIG. 1. is a top plan view of a helicopter rotor blade.

FIG. 2 is a perspective view of a section of a helicopter rotor blade without the trailing edge assembly.

FIG. 3. is an exploded perspective view of the trailing edge assembly of a helicopter rotor blade.

FIG. 4. is a cross-sectional view of a portion of the helicopter rotor blade of FIG. 1 taken along line 4—4.

FIG. 5 is a cross-sectional view of a portion of the trailing edge assembly of a helicopter rotor blade illustrating a second embodiment.

FIG. 6. is a cross-sectional view of a portion of the trailing edge assembly of a helicopter rotor blade illustrating a third embodiment.

FIG. 7 is a cross-sectional view of a portion of the trailing edge assembly of a helicopter rotor blade illustrating a fourth embodiment.

FIG. 8 is a cross-sectional view of a portion of the trailing edge assembly of a helicopter rotor blade illustrating a fifth embodiment.

FIG. 9. is a cross-sectional view of a portion of the trailing edge assembly of a helicopter rotor blade illustrating a sixth embodiment.

DESCRIPTION OF THE PREFERRED EMBODIMENT

Referring now to FIGS. 1-3 a helicopter rotor blade 10 is shown having a leading edge 12 and a trailing edge 14. The blade 10 has a skin 16, typically a thin sandwich of an epoxy/graphite core between metal such as stainless steel, folded so as to form a sandwich with the fold forming the leading edge 12. A forward spanner 18, an intermediate spanner 20 and a rear spar 22 run longitudinally the length of the blade 10 within the skin 16 to provide structural support. The spanners 18, 20 and spar 22 form ducts within the blade 10 through which a compressed fluid, such as air, may be transmitted from the rotor hub (not shown) to which the blade is attached. The rear spar 22 has holes 24 in a row along its length so that the compressed fluid can flow through the blade 10 to the trailing edge assembly 26 as shown by the arrows in FIG. 1. The ducts conduct the compressed fluid to the trailing edge assembly 26 to provide a fairly uniform flow through a slot 28 in the assembly along the entire span of the blade 10.

The trailing edge assembly 26 has three components — a lip 30, a fluted core or vanes 32 and a coanda edge 34. The slot 28 is formed by the juxtaposition of the lip 30 and the coanda edge 34 to each other, as shown more clearly in FIG. 4. The fluted core 32 is bonded between the lip 30 and the coanda edge 34 to provide structural support for the trailing edge assembly 26. A plurality of openings 36 through the fluted core 32 have thin sidewalls 38 between them, which sidewalls act as vanes to smooth the compressed fluid flowing through the hole 24 of the rear span 22 to provide non-turbulent flow through the slot 28. The openings 36 of the fluted core 32 are aligned with the holes 24 of the rear spar 22 when the trailing edge assembly 26 is installed in the blade 10.

The lip 30 is a solid laminate, typically of a unidirectional fiberglass cloth with epoxy resin. A metal insert 40, such as 0.005" stainless steel shim stock, may be laminated to the lower face of the lip 30 to maintain the lower contour and the sharpness of the lip trailing edge 42. To provide the rigidity of the fluted core 32 for maintaining the dimensional control of the components of the trailing edge assembly 26, yet have a flexibility to eliminate fatique failures under bending loads applied to the blade, a casting of a fiber-resin/reactive resin (60/40) material may be used.

The coanda edge 34 has a deformable tube 44, forming a smoothly bulbous trailing edge 14, and a stiffening leg 46 integral with the tube. The stiffening leg 46 may be made of a low density casting resin, such as polyamin, and the tube 44 may be a fiberglass/epoxy material of sufficient thickness, optimally approximately 0.060", to provide adequate flexibility for adjustment while maintaining spanwise rigidity. An outer wrap 48 of the fiberglass/epxoy material may be used to assure integrity between the tube 44 and the leg 46.

The width of the slot 28 is critical since the function of the slot is to introduce fluid flow over the trailing edge 14 which entrains the fluid medium in which the blade 10 is operating to follow the surface of the blade 10 to create additional lift (coanda effect) in the same manner as a flap in a conventional airfoil. The amount of lift is controlled by modulating the compressed fluid flow by suitable valving at the hub. If the slot width is too narrow, then there is insufficient fluid flow to entrain the fluid medium; and if the slot is too wide, the fluid flow is too thick and will not follow the surface over the trailing edge. For a helicopter rotor blade using compressed air the critical slot width is approximately 0.002 times the chord of the blade. To provide this critical slot width uniformly throughout the length of the slot is not currently possible by existing manufacturing techniques. Therefore, some means for adjusting the slot width along its entire width after manufacture is necessary without introducing mechanical means at the slot which would create turbulence and disturb the laminar flow.

FIG. 4 shows one method for adjusting the slot width. A screw retainer 50 and a wear strip 52 are bonded within the tube 44 by a suitable adhesive. A plurality of set screws 54 are installed at regular intervals through set screw holes 56 in the bottom of the coanda edge 34 to project into the tube 44 through the screw retainer 50 to rest against the wear strip 52. By tightening or loosening the set screws 54 the tube 44 is deformed to decrease or increase the slot width. Therefore, relative macroscopic adjustments of the set screws 54 provide a microscopic adjustment of slot width which can be made uniform throughout the length of the slot 28.

After the slot width has been adjusted, the set screw holes 56 may be filled with an aerodynamic filler compound 58 to provide a smooth surface, as shown in FIG. 5. The embodiment of FIG. 5 is the same as that of FIG. 4 except the wear strip has been eliminated.

The embodiment of FIG. 6 introduces a second set of set screws 54' located intermediately and orthogonally to the set screws 54. The screws 54, 54' are adjusted in opposition to each other, i.e., tightening of set screws 54 requires an equal loosening of set screws 54', and vice versa.

FIG. 7 represents still another embodiment for adjusting the slot width. The set screws 50 have a cone shaped end which extends to the center of the tube 44. A built-in channel 62, which may be of springy material or have conical protrusions 64 with a circular spring 66, is bonded to the interior of the tube 44. The channel 62 pulls the tube 44 so as to narrow the slot width, and adjustment of set screws 60 by tightening opens the slot 28, i.e., increases the slot width.

In FIG. 8 the slot 28 is fabricated wider than optimum and a cone shaped mechanism 68 is tightened to decrease the slot width. The trailing edge of the coanda edge 34 has a tapered transverse slot 70 in the stiffening leg 46 in which the cone shaped mechanism 68 closely fits. Tapered set screws 72 are used to decrease the slot width by tightening the cone shaped mechanism 68 in the transverse slot 70. The force generated is transferred through the relatively thin portion of the stiffening leg 46 between the transverse slot 70 and the deformable tube 44, causing the tube to deform to decrease the slot width.

FIG. 9 shows an eccentric type adjustment mechanism in the stiffening leg 46 adjacent to the tube 44. A post 74 has an eccentric base 76, and is retained in a post hole 78 in the leg 46 with an eccentric opening 80 to accommodate the eccentric base. The post 74 has a groove 82 in which a retaining ring 84 is located, the retaining ring fitting into a niche 86 in the post hole 78 to hold the post in place. Adjacent to the post hole 78 between the post hole and the tube 44 is a transverse slot 88 connected to the post hole by a slit 90 at the depth of the eccentric opening 80. the eccentric base 76 rests against the side of the eccentric opening 80 adjacent the transverse slot 88 so that as the post 74 is rotated by means of set screw 92 the transverse slot is widened or lessened to decrease or increase the slot width. A cover 94 covers the eccentric opening 80 after the slot width has been adjusted to provide a smooth aerodynamic surface.

Thus, the present invention provides a circulation controlled rotor blade which uses the coanda effect rather than mechanical linkages to provide lift and eliminate flutter. Means for adjusting the slot makes it possible to provide a uniform slot width without introducing turbulence or interfering with the laminar flow over the coanda edge.

What is claimed is:
1. A circulation controlled rotor blade comprising:
   (a) a skin folded to form a sandwich, the fold of said sandwich being the leading edge of said rotor blade;
   (b) a spanner within said sandwich and attached to said skin to provide structural support;
   (c) a rear spar within and attached to said sandwich near the open end opposite the fold, said rear spar having a plurality of holes therethrough;
   (d) a fluted core having a plurality of openings with thin sidewalls, said openings being aligned with said rear spar;
   (e) a lip bonded to the upper surface of said fluted core and to the underside of the upper portion of said sandwich at said open end;
   (f) a coanda edge having a flexible spanwise tube and a leg integral with said tube to provide stiffening, the upper surface of said leg being bonded to the bottom of said fluted core such that said tube is in juxtaposition with said lip to form a spanwise slot, and the lower surface of said leg being bonded to the interior of the lower portion of said sandwich at said open end so that said fluted core, lip and coanda edge form a trailing edge assembly capable of supporting the coanda effect; and
   (g) means for conducting compressed fluid through said rotor blade, said rear spar and said fluted core to produce a uniform, laminar flow from said slot.

2. A circulation controlled rotor blade as recited in claim 1 further comprising means for adjusting the width of said spanwise slot without disturbing the uniform, laminar flow therethrough.

3. A circulation controlled rotor blade as recited in claim 2 wherein said adjusting means comprises:
   (a) a plurality of set screws evenly distributed along the span of said coanda edge which protrude into said flexible tube through a plurality of set screw holes in the under side of said coanda edge such that the ends of said set screws abut against the inner wall of said flexible tube adjacent said spanwise slot; and
   (b) a screw retainer bonded to the interior of said flexible tube through which said set screws pass such that tightening of said set screws applies force to deform said flexible tube to narrow the width of said spanwise slot.

4. A circulation controlled rotor blade as recited in claim 3 wherein said adjusting means further comprises a wear strip bonded to the inner wall of said flexible tube adjacent said spanwise slot against which the ends of said set screws rest.

5. A circulation controlled rotor blade as recited in claim 4 further comprising an aerodynamic filler in said set screw holes to present a smooth underside for said coanda edge after the width of said spanwise slot has been adjusted.

6. A circulation controlled rotor blade as recited in claim 3 wherein said adjusting means further comprises:
   (a) a second set of set screws alternating with and orthogonal to said plurality of set screws, said second set of set screws protruding into said flexible tube such that the ends of said second set of set screws abut against the inner wall of said flexible tube; and (b) a second screw retainer bonded to the interior of said flexible tube through which said second set of set screws pass such that alternately tightening and loosening said plurality of set screws and said second set of set screws deforms said flexible tube to narrow the width of said spanwise slot.

7. A circulation controlled rotor blade as recited in claim 2 wherein said adjusting means comprises:
(a) a plurality of set screws having cone shaped ends which protrude into the center of said flexible tube through a plurality of set screw holes in the underside of said coanda edge; and
(b) a channel bonded to the interior of said flexible tube and situated to pull said flexible tube to narrow the width of said spanwise slot, said channel contacting said set screws so that tightening said set screws against said channel widens the width of said spanwise slot.

8. A circulation controlled rotor blade as recited in claim 7 wherein said channel is comprised of a springy material.

9. A circulation controlled rotor blade as recited in claim 7 wherein said channel has conical protrusions within which the cone shaped ends of said set screws abut and a circular spring around each of said conical protrusions to provide the pull to narrow the width of said spanwise slot.

10. A circulation controlled rotor blade as recited in claim 2 wherein said adjusting means comprises:
(a) a tapered slot in said leg adjacent said flexible tube;
(b) a cone shaped mechanism which closely fits within said tapered slot; and
(c) a plurality of set screws affixed to said tapered slot and said cone shaped mechanism such that tightening said set screws causes said cone shaped mechanism to move upward in said transverse slot, deforming said flexible tube so as to narrow the width of said spanwise slot.

11. A circulation controlled rotor blade as recited in claim 2 wherein said adjusting means comprises:
(a) a plurality of posts having eccentric bases rotatably held in a plurality of post holes in said leg adjacent said flexible tube, said post holes communicating via a slit with a transverse slot between said post holes and said flexible tube; and
(b) means for rotating said posts such that the eccentric bases cause said transverse slot to become thicker, thereby deforming said flexible tube so as to narrow the width of said spanwise slot.

12. A circulation controlled rotor blade as recited in claim 11 further comprising a cover over said post holes to present an aerodynamically smooth surface for said coanda edge after the width of said spanwise slot has been adjusted.

13. A circulation controlled rotor blade as recited in claim 2 wherein said lip further comprises a metal insert laminated to the lower face of said lip to maintain the lower contour and sharpness of the trailing edge of said lip.

* * * * *